United States Patent [19]
Noll

[11] Patent Number: 5,940,559
[45] Date of Patent: Aug. 17, 1999

[54] FIBER-OPTIC TEST PROBE AND CONNECTOR ADAPTER FOR TESTING FIBER-OPTIC CONNECTOR HARNESSES

[75] Inventor: Gregory Bruce Noll, Burbank, Calif.

[73] Assignee: Glenair, Inc., Glendale, Calif.

[21] Appl. No.: 08/682,096

[22] Filed: Jul. 17, 1996

[51] Int. Cl.⁶ .............................. G02B 6/00; G02B 6/36
[52] U.S. Cl. .............................................................. 385/53
[58] Field of Search ................................. 385/58, 59, 69, 385/88–92

[56] References Cited

U.S. PATENT DOCUMENTS

| | | |
|---|---|---|
| 3,990,779 | 11/1976 | McCartney . |
| 4,279,469 | 7/1981 | Forman ...................................... 385/88 |
| 4,526,438 | 7/1985 | Essert . |
| 4,789,218 | 12/1988 | Paul et al. .................................. 385/58 |
| 4,964,690 | 10/1990 | Lappöhn et al. . |
| 5,073,042 | 12/1991 | Mulholland et al. . |
| 5,134,280 | 7/1992 | Johnston et al. . |
| 5,142,598 | 8/1992 | Tabone . |
| 5,661,843 | 8/1997 | Rickenbach et al. . |

FOREIGN PATENT DOCUMENTS

| | | |
|---|---|---|
| 0 024 959 | 3/1981 | European Pat. Off. . |
| 1 563 077 | 3/1980 | United Kingdom . |
| 2 057 711 | 4/1981 | United Kingdom . |
| 2 165 401 | 4/1986 | United Kingdom . |

Primary Examiner—Akm E. Ullah
Attorney, Agent, or Firm—Fitch, Even, Tabin & Flannery

[57] ABSTRACT

A fiber-optic test probe and connector adapter for testing fiber-optic terminations, for example, in fiber optic connector assemblies. A single and multi-channel connector adapter is provided that is adapted to be attached to the fiber-optic connector to be tested. In one embodiment of the invention, the connector adapter includes an alignment sleeve that enables the terminus of the fiber-optic connector to be tested to be axially aligned with the terminus of the test probe. In order to eliminate air gaps between the respective termini, the fiber-optic test probe and connector adapter are configured to provide axial compression forces between the mating termini in a test position in order to eliminate air gaps therebetween and thus reduce transmission losses. The test probe may be provided with strain relief and anti-bending boot, which prevents radial forces from misaligning the termini. The test probe includes a release sleeve that allows the test probe to be quickly released from its locked position. In an alternate embodiment of the invention, the alignment sleeve may be formed as part of the test probe. A probe calibration adapter, or feed-through adapter, is also provided, which enables two test probes to be coupled together for purposes of calibration. The feed-through adapter is configured to provide precise alignment between the respective termini of the test probe termini, while providing axial compression forces therebetween, similar to the adapter to reduce transmission losses and thus improve performance while providing good repeatability of the test measurements.

17 Claims, 17 Drawing Sheets

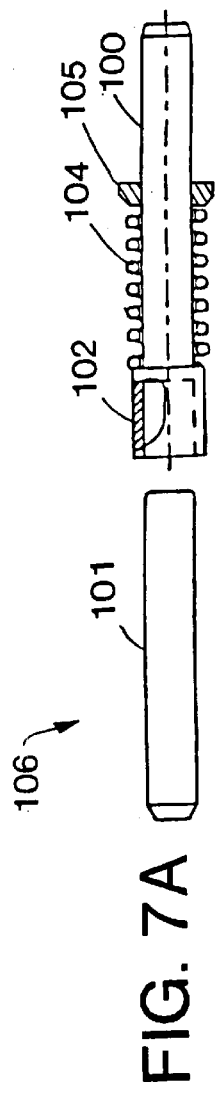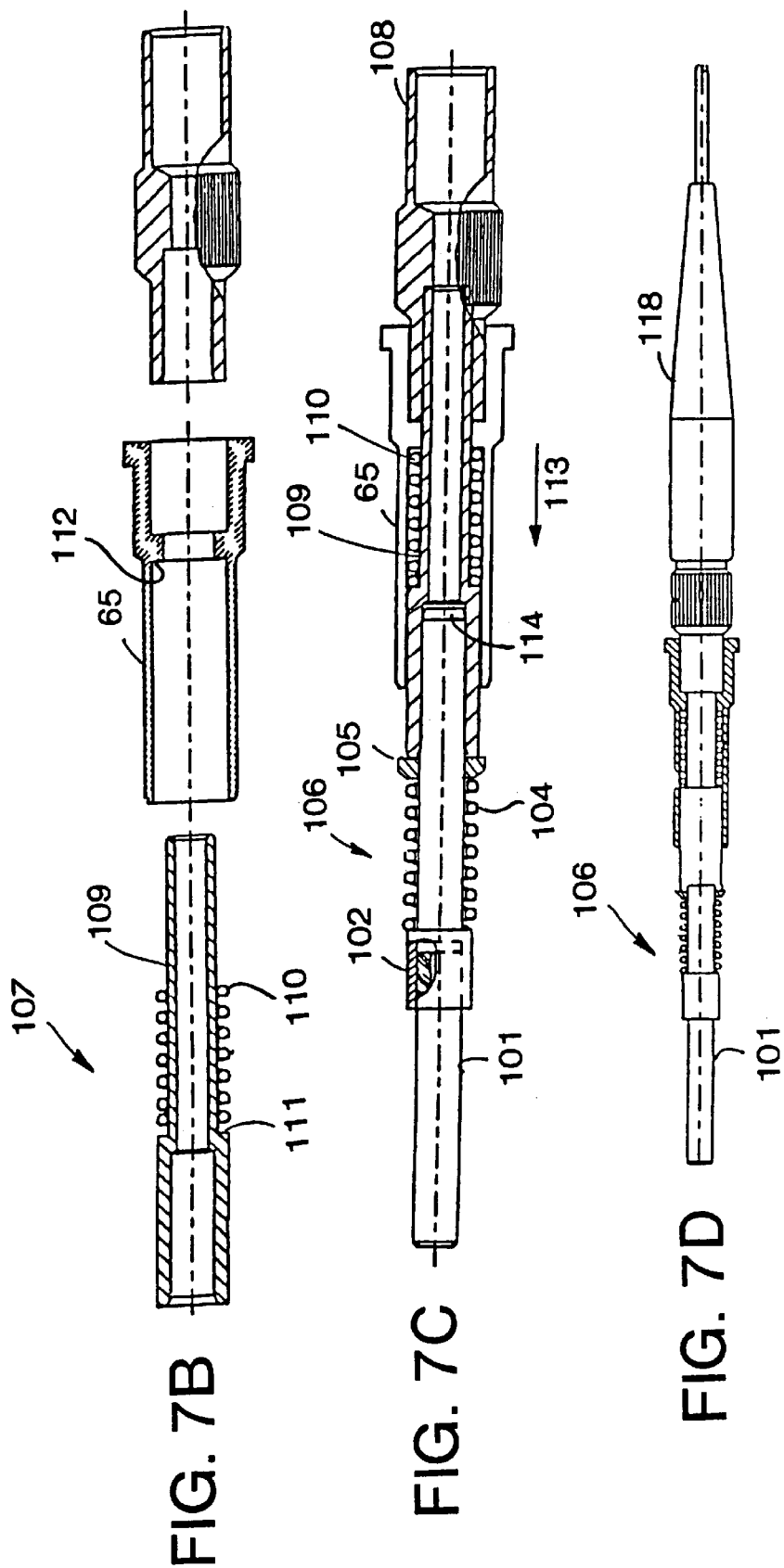
FIG. 7A  FIG. 7B  FIG. 7C  FIG. 7D

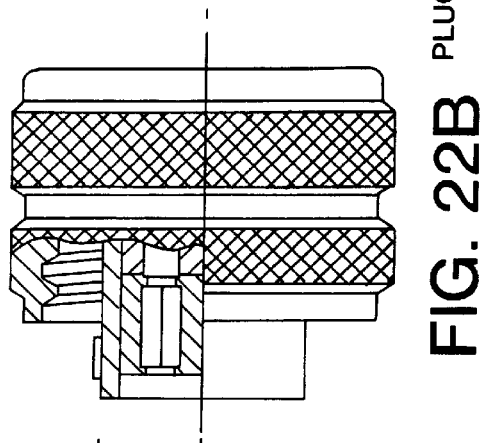
FIG. 22A PLUG ADAPTER / PIN INSERT
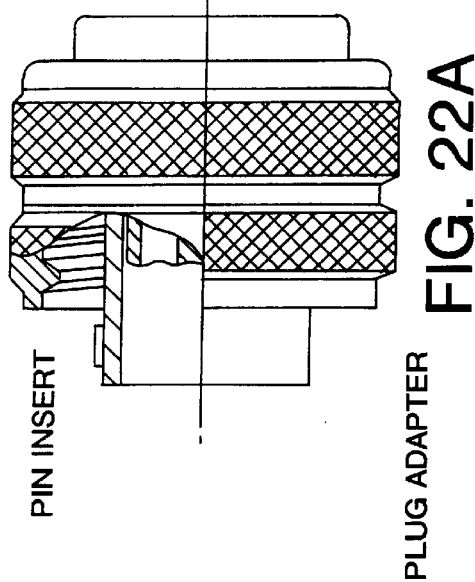
FIG. 22B PLUG ADAPTER / SOCKET INSERT WITH ALIGNMENT SLEEVES
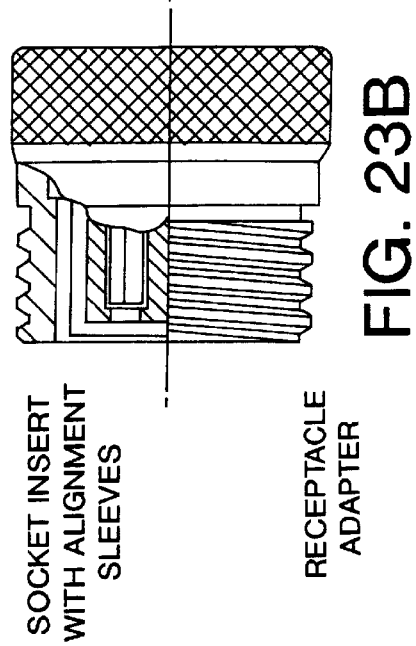
FIG. 23A RECEPTACLE ADAPTER / PIN INSERT
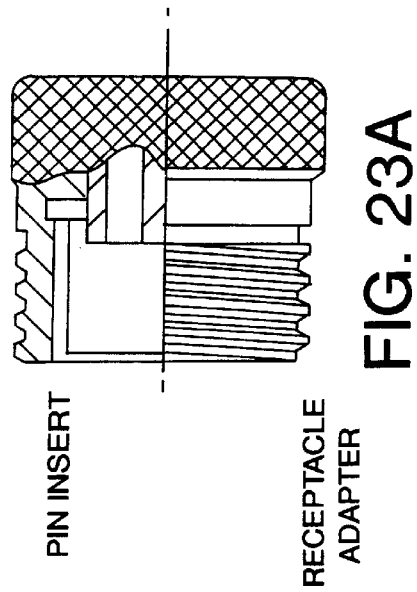
FIG. 23B RECEPTACLE ADAPTER / SOCKET INSERT WITH ALIGNMENT SLEEVES ified with the reference numeral 20. The optical connector 20 is
FIBER-OPTIC TEST PROBE AND CONNECTOR ADAPTER FOR TESTING FIBER-OPTIC CONNECTOR HARNESSES

BACKGROUND OF THE INVENTION

1. Field of the Invention

The present invention relates to a fiber-optic test probe and a connector adapter for testing fiber-optic terminations for example, in fiber optic connector assemblies and, in particular, to a fiber-optic test probe and connector adapter that provides relatively precise axial alignment of the test probe relative to the mating terminus to be tested. The test probe includes a compression spring which preloads the terminus of the test probe against the terminus to be tested in order to minimize the air gap therebetween thereby minimizing transmission losses, such as Fresnel reflection losses and improving performance of the test system.

2. Description of the Prior Art

Fiber-optic systems are used in many applications to transmit analog and digital data signals. For example, fiber-optic systems are used in high-speed data communications and telecommunications, in part, because of their insensitivity to electromagnetic interference. Because of the relatively small size, light weight and immunity to electromagnetic interference, fiber-optic systems are known to be used in various applications including automobiles, aircraft and ships.

Terminations of fiber-optic cables require precise axial alignment of the optic fibers to avoid reflection and refraction of the light in order to avoid errors and distortions of the optical output signals. Various multi-channel optical systems are known. Such multiple channel optical systems utilize multiple optical fibers terminated to optical connectors. Various methods are known for testing the terminations of the optical fibers within the optical connectors, as shown in FIGS. 1, 2 and 3.

FIG. 1 illustrates a known optical connector, identified with the reference numeral 20. The optical connector 20 is a four-channel device used to terminate four optical fibers. The optical connector 20 includes a socket insert 22 with axial bores 24 in which the optical fibers are terminated to contacts or termini. Each of the optical fibers terminated in the optical connector 20 are tested individually by inserting a mating like terminus 26 into its respective axial bore 24. The mating terminus 26 includes a terminated fiber (not shown) for contacting an opposing terminus in the optical connector to be tested. The mating terminus 26 is connected by way of a simplex cable 27 to test equipment (not shown).

Although such a method provides a relatively cost-effective method to test the terminations of the optical fibers within the optical connector 20, the terminus is subject to radial loads (i.e. loads or components of loads generally perpendicular to the axis of the terminus in the probe), which can affect the axial alignment of the test terminus 26 relative to the terminus within the optical connector 20 to be tested. Should the test terminus 26 become even slightly axially misaligned with the terminus in the optical connector 20, reflection and refraction of the light will result in losses and thus inaccurate measurements.

Another known method for testing optical fibers terminated in an optical connector is illustrated in FIG. 2. With this method 5A, 5B a mating connector is utilized with opposite style interfacing termini. Although such a method provides relatively precise axial alignment of the optical fibers, it requires matching multi-channel test connector harnesses for each different type of optical connector 20 and is thus relatively expensive. In addition, the multi-channel test connector harness 28 is relatively difficult to maintain. For example, if one of the terminus gets dirty or is damaged, the entire multi-channel test connector harness 28 may have to be disassembled and replaced.

A third known method for testing the fiber-optic terminations is illustrated in FIG. 3. In this method an adapter 30 is utilized that is adapted to be coupled directly to the fiber-optic connector 20 to be tested. As shown in FIG. 3, the adapter 30 includes an alignment sleeve 32, which allows a terminus 34, carried by the fiber-optic connector 20 to be aligned with a terminus 36 of a fiber optic test probe 38. Even though the alignment sleeve 32 provides good axial alignment between the respective termini, the configuration allows for slight air gaps between the respective termini, which can result in reflections which in turn result in transmission losses. The air gap is caused by a lack of a biasing force to hold the two terminus ferrules together.

SUMMARY OF THE INVENTION

It is an object of the present invention to solve various problems in the prior art.

It is yet another object of the present invention to provide a fiber-optic test probe and connector adapter that allows for relatively precise angular and axial alignment between the respective termini of the fiber-optic connector and the test probe.

It is yet another object of the present invention to provide a fiber-optic test probe and connector adapter that minimizes, if not eliminates, air gaps between the respective termini.

It is yet another object of the present invention to provide a fiber-optic test probe and connector adapter in which the terminus of the test probe is axially biased against the terminus of the fiber-optic connector to minimize air gaps, thus reducing transmission losses.

Briefly, the present invention relates to a fiber-optic test probe and connector adapter for testing fiber-optic terminations, for example in fiber optic connector assemblies. A single and multi-channel connector adapter is provided that is adapted to be attached to the fiber-optic connector to be tested. In one embodiment of the invention, the connector adapter includes an alignment sleeve that enables the terminus of the fiber-optic connector to be tested to be axially aligned with the terminus of the test probe. In order to eliminate air gaps between the respective termini, the fiber-optic test probe and connector adapter are configured to provide axial compression forces between the mating termini in a test position in order to eliminate air gaps therebetween and thus reduce transmission losses. The test probe may be provided with strain relief and anti-bending boot, which prevents radial forces from misaligning the termini. The test probe includes a release sleeve that allows the test probe to be quickly released from its locked position. In an alternate embodiment of the invention, the alignment sleeve may be formed as part of the test probe. A probe calibration adapter, or feed-through adapter, is also provided, which enables two test probes to be coupled together for purposes of calibration. The feed-through adapter is configured to provide precise alignment between the respective test probe termini, while providing axial compression forces therebetween, similar to the adapter to reduce transmission losses and thus improve performance while providing good repeatability of the test measurements.

BRIEF DESCRIPTION OF THE DRAWING

These and other objects of the present invention will be readily understood with reference to the following specification and attached drawing, wherein:

FIG. 7A is a partial sectional view of the terminus assembly that forms a part of the fiber optic test probe in accordance with the present invention;

FIG. 7B is a partial sectional view of the spring retainer body, removal sleeve and rear probe body which forms a part of the fiber optic test probe in accordance with the present invention;

FIG. 7C is a partial section view of the fiber optic test probe assembled to a fiber optic cable in accordance with the present invention;

FIG. 7D is a longitudinal quarter-section assembled view of a fiber-optic probe in accordance with the present invention;

FIG. 22A is an axial view of a connector adapter in accordance with the present invention, partially broken away, configured as a receptacle with a pin insert.

FIG. 22B is similar to FIG. 22A but configured as a receptacle with a socket insert.

FIG. 23A is similar to FIG. 22A but configured as a plug with a pin insert.

FIG. 23B is similar to FIG. 22A but configured as a plug with a socket insert.

DETAILED DESCRIPTION OF THE INVENTION

Figure 1:
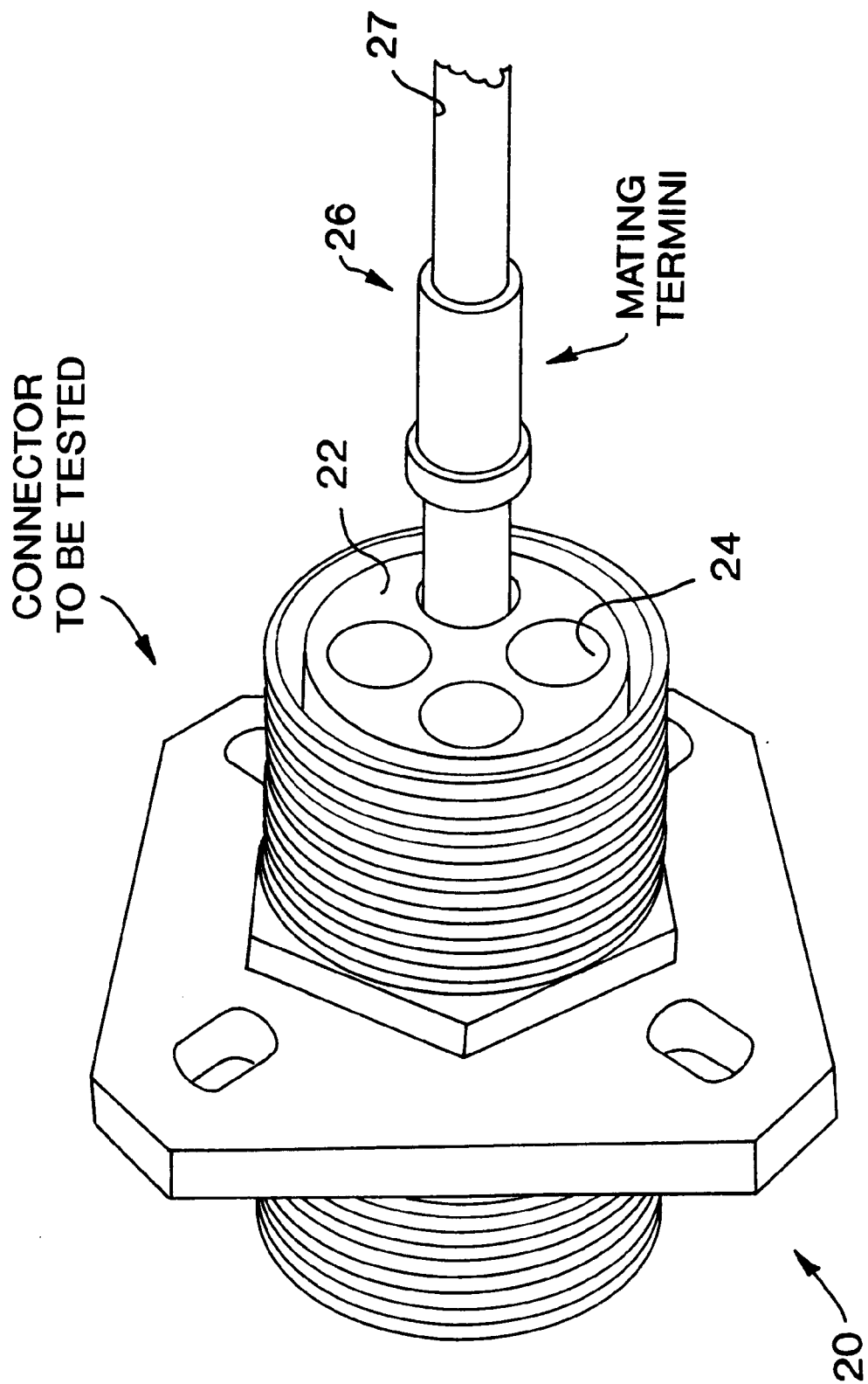
FIG. 1 is a perspective view of a known mating pin terminus assembled to a fiber-optic connector.
Figure 2:
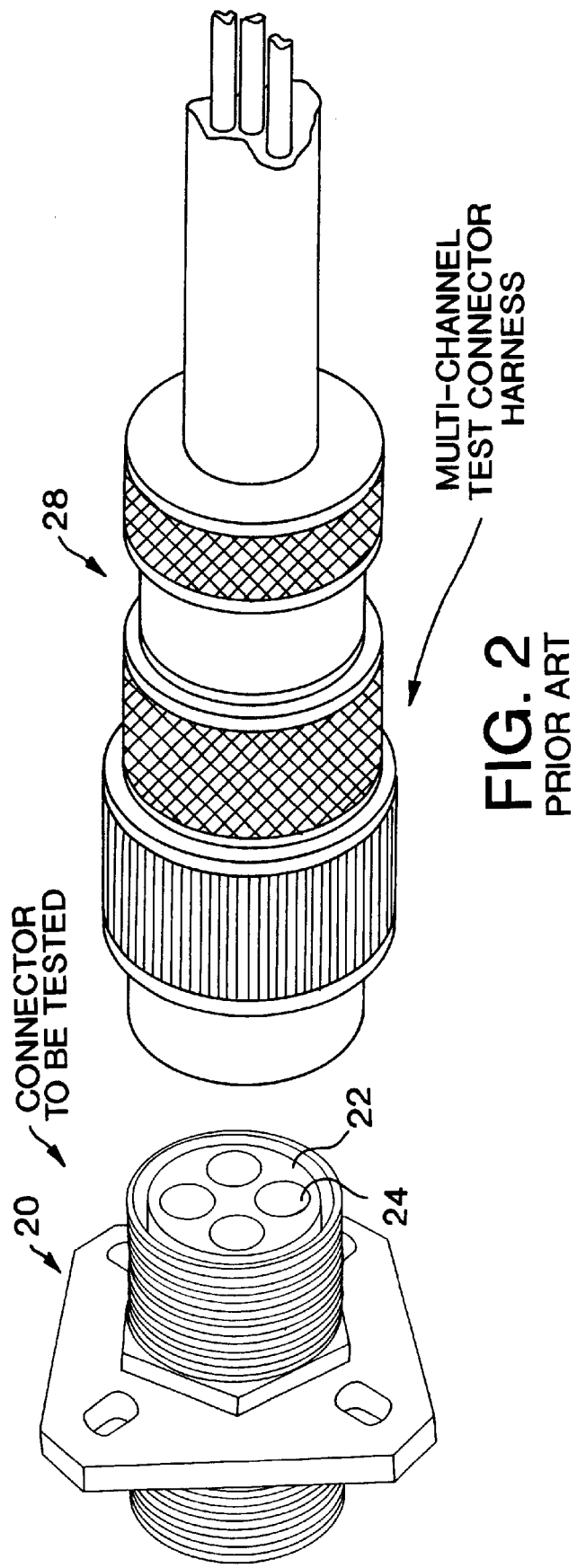
FIG. 2 is an axial perspective view of a known multi-channel test connector harness and a fiber-optic connector.
Figure 3:
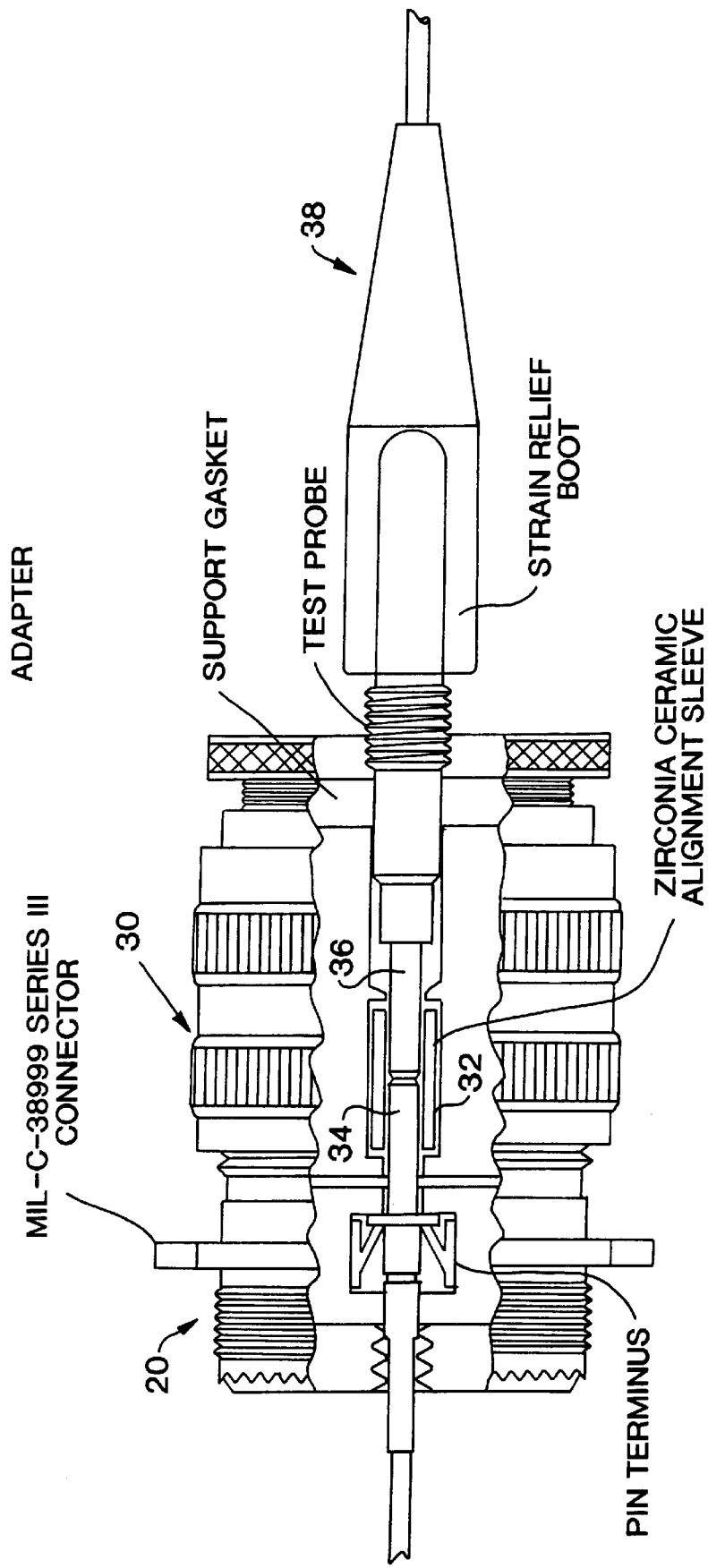
FIG. 3 is a axial view partially in section of a known fiber-optic connector adapter and test probe assembled to a fiber-optic connector.
Figure 5A:
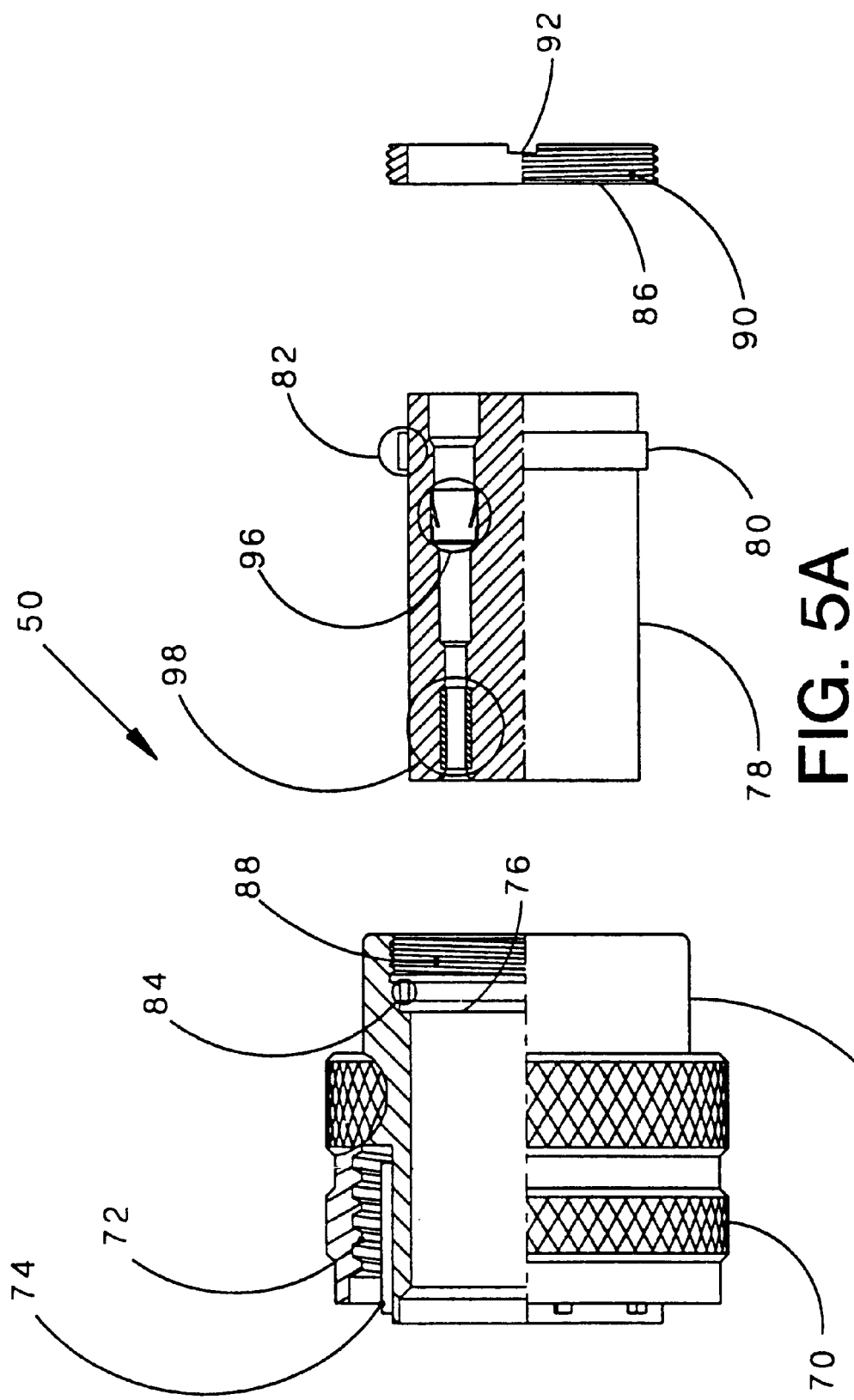
FIG. 5A is a longitudinal quarter-section exploded view illustrating the connector adapter in accordance with the present invention.
Figure 5B:
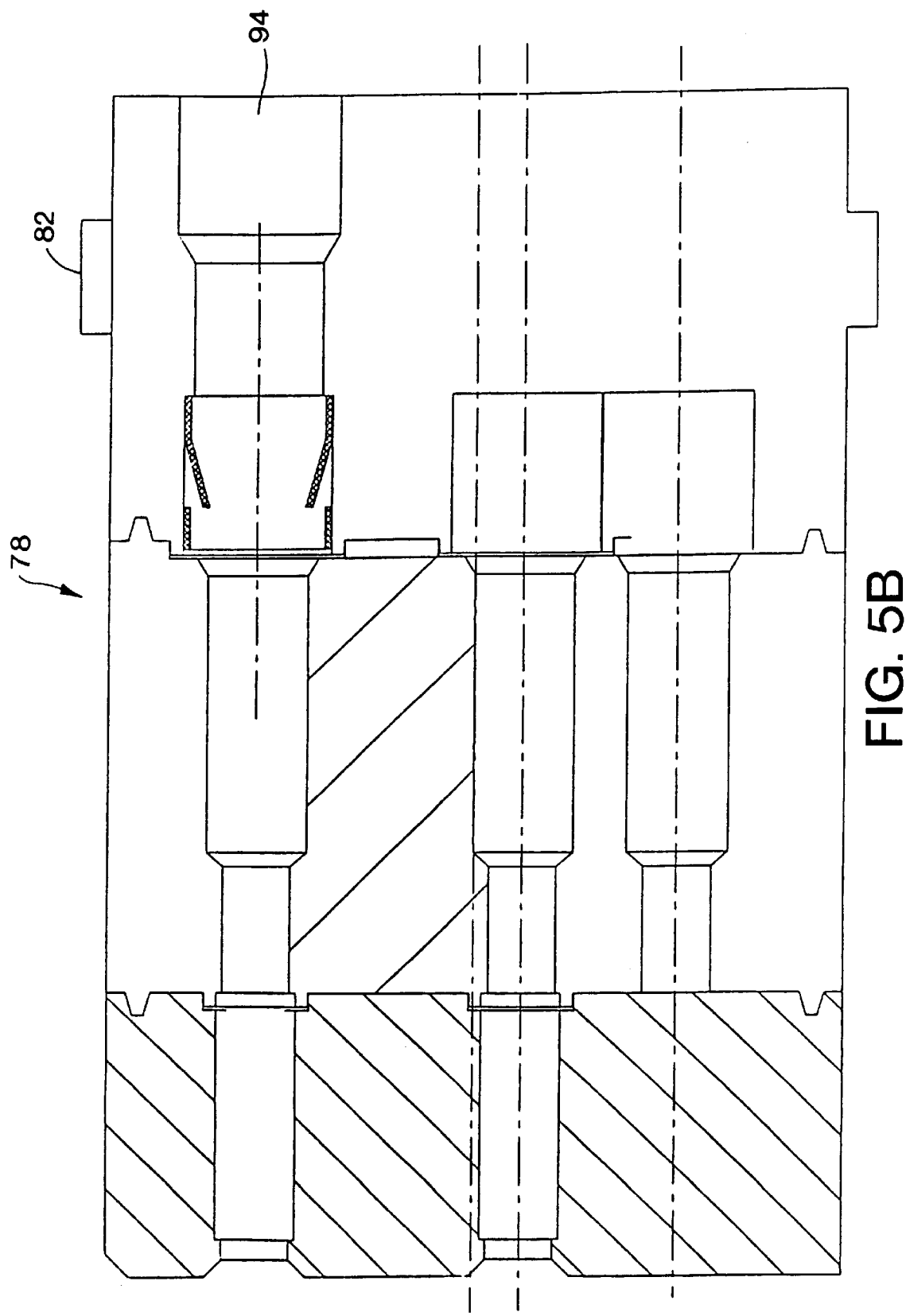
FIG. 5B is an enlarged sectional view of an insert which forms a part of a connector adapter in accordance with the present invention.
Figure 6:
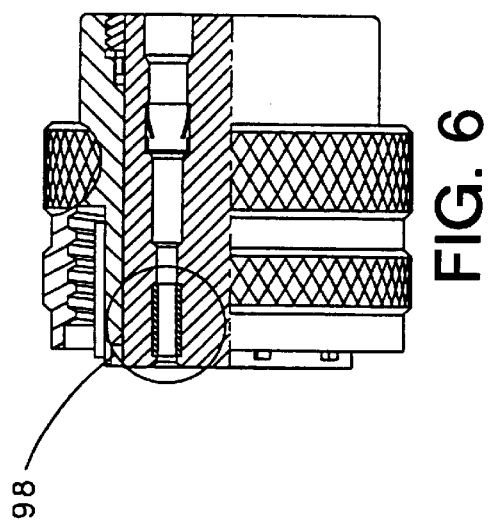
FIG. 6 is a longitudinal quarter section of the connector adapter illustrated in FIG. 5A.

The present invention relates to a fiber-optic test probe and a connector adapter for use in testing multi-channel or single channel fiber optic cable assemblies. One embodiment of the connector adapter is illustrated in FIGS. 5A, 5B and 6, while the test probe adapter is illustrated in FIGS. 7A–7D. FIGS. 14–17, 22 and 23 illustrate a test probe calibration adapter for use with calibrating the test probes illustrated in FIG. 3. FIGS. 18–21 illustrate an alternative embodiment of the test probe adapter illustrated in FIG. 7.

An important aspect of the invention is that the connector adapter, test probe calibration adapter, as well as the test probe, not only provide axial alignment of the termini of the test probe adapter and fiber-optic connector, but also provide support from radial forces, as well as strain relief to prevent the termini from being misaligned, which can cause transmission losses due to reflection and refraction of the light in the assembly. Another important aspect of the invention is that the connector adapter, as well as calibration probe adapter and test probe, are configured to provide axial compression forces between the terminus of the test probe and the terminus in the optical connector to be tested in order to improve contact force between eliminate air gaps therebetween that can cause transmission losses.

Figure 4:
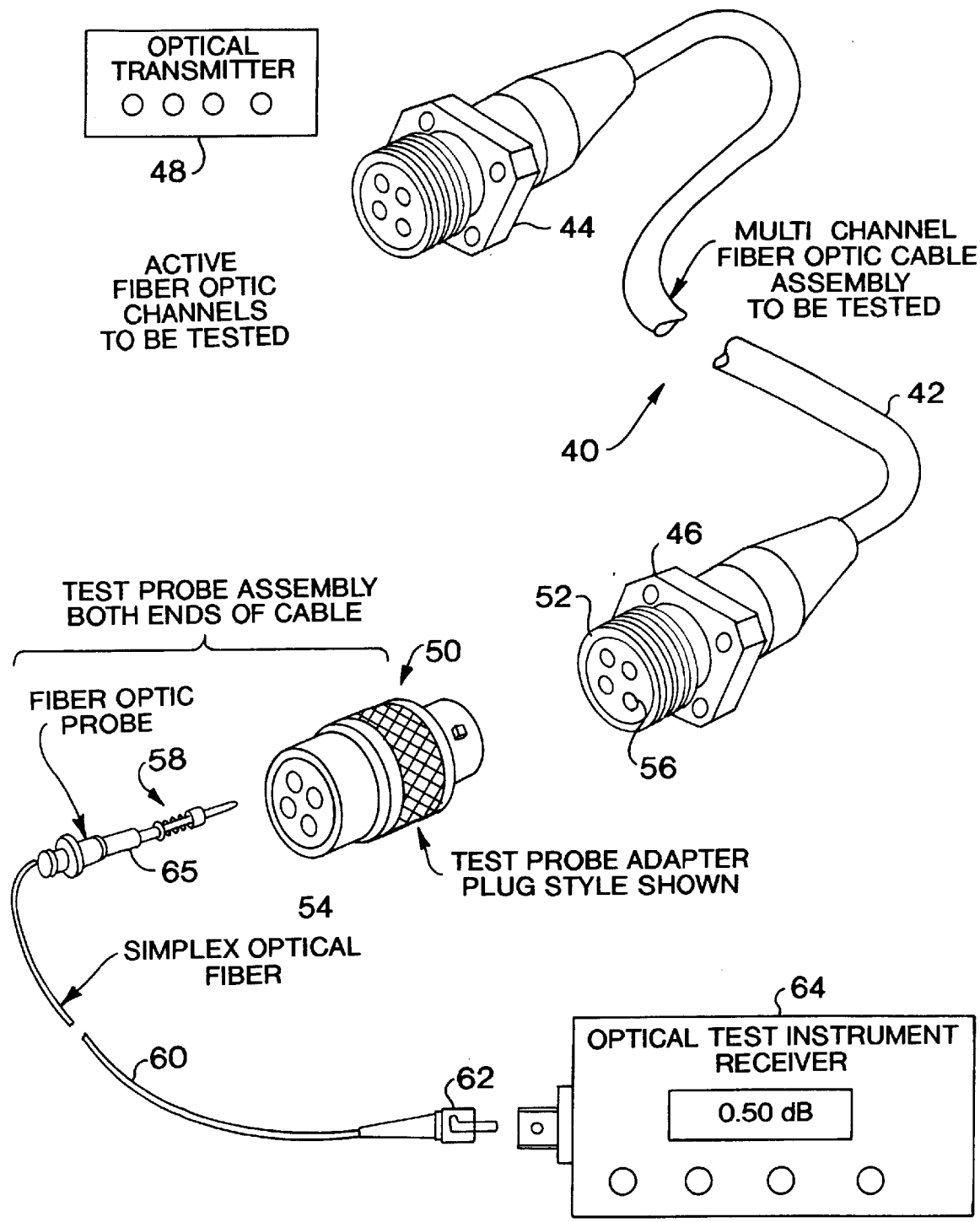
FIG. 4 is a perspective diagram illustrating a test configuration for a multi-channel fiber-optic cable assembly incorporating the fiber-optic test probe and connector adapter in accordance with the present invention.

A system for testing a multi-channel fiber-optic cable assembly is illustrated in FIG. 4. The multi-channel fiber-optic cable assembly to be tested is generally identified with the reference numeral 40 and includes a multi-channel fiber-optic cable 42, terminated at each end to fiber-optic connectors 44 and 46. As shown, the fiber-optic connectors 44 and 46 are shown as four-channel devices. However, as will be apparent to those of ordinary skill in the art, the principles of the present invention are applicable to virtually any multi-channel or single channel plug or receptacle fiber-optic connector. The four-channel connectors 44 and 46 are merely used herein for example.

One end of the multi-channel fiber-optic cable assembly 44 is terminated to a connector adapter 50. A test probe 58, discussed below, is coupled between the connector adapter 50 and an optical transmitter 48. As will be discussed in more detail below, the connector adapter 50 is configured as a receptacle and thus includes a coupling nut that is adapted to mate with screw threads 52 on the fiber-optic connector 46. However, as will be understood by those of ordinary skill in the art, the principles of the present invention apply to connector adapters configured as receptacles as illustrated in FIGS. 23A and 23B, as well as connector adapters configured as plugs, as illustrated in FIGS. 22A and 22B. As is known in the art, plug adapters include a coupling nut with internal threads. Receptacles include a male threaded portion on the adapter body as shown in FIGS. 22 and 22B. Moreover, the principles of the invention apply to receptacle and plug adapters with pin inserts as illustrated in FIGS. 23A and , respectively, as well as to receptacle and plug adapters with socket inserts as illustrated in FIGS. 23B and 22B, respectively. In addition, the principles of the present invention are equally applicable to both single channel and multi-channel connectors. For simplicity, only receptacle type multi-channel connector adapters with socket inserts are described in detail.

As shown in FIG. 4, the connector adapter 50 includes a plurality of sockets 54. These sockets 54 are adapted to be aligned with pins 56 that form a part of fiber-optic connector 46. The test probe, in accordance with the present invention and generally identified with the reference numeral 58, is connected by way of a simplex optical fiber 60 to a standard fiber optic connector 62, for example, an ST, FC or SMA type single channel connector, to enable the test probe 58 to be connected to an optical receiver 64.

The fiber-optic test probe 58 is received into each of the sockets 54 in the connector adapter 50 and mated with the pins 56 in the fiber-optic connector 46. As will be discussed in more detail below, the configuration of the connector adapter 50 and the fiber optic test probe 58 are adapted to enable the fiber optic test probe 58 to be locked into position as well as provide not only axial alignment between the respective termini of the test probe 58 and fiber-optic connector 46, but also axial compression forces between the respective termini to minimize, if not eliminate, the air gap between the respective termini to reduce transmission losses and thus increase performance of the system to ensure repeatability of the test measurements. The test probe 58 includes a probe removal sleeve 65, which facilitates removal of the test probe 58 from the connector adapter 50 and also protect the test probe 59 from radial forces, which can result in axial misalignment and losses. In addition, as will be discussed in more detail below, the test probe 58 can be provided with a strain relief boot to further minimize losses due to strain.

The connector adapter 50, in accordance with the present invention, is illustrated in FIGS. 5A, 5B and 6. The connector adapter 50 includes an adapter body 68 and a coupling nut 70. As mentioned above, the principles of the invention apply to both receptacle and plug adapters, as illustrated in FIGS. 23A, 23B and 22A, 22B, as well as to adapters with pin inserts as illustrated in FIGS. 22A and 23A and adapters with socket inserts FIGS. 22B and 23B.

As disclosed in co-pending U.S. patent application Ser. No. 08/317,725, filed on Oct. 4, 1994, assigned to the same assignee as the assignee of the present invention, hereby incorporated by reference, the adapter body 68 is provided with interior annular shoulders (not shown) while the coupling nut 70 is formed with a flared end (not shown), which allows the adapter body to be axially captured relative to the coupling nut 70 once the flared end of the coupling nut 70 is crimped. It will also be understood that the configuration of the adapter body 68 and coupling nut 70 is not critical to the practice of the invention. More particularly, other coupling nut/adapter body configurations which allow for free rotation between the coupling nut and adapter body are suitable for use with the invention, including known retaining ring configurations for axially securing the adapter body 68 to the coupling nut 70.

The coupling nut 70 is provided with a connector engagement thread 72, which enables the coupling nut 70 to be threaded onto the corresponding threads 52 (FIG. 4) on the fiber-optic connector 46 (FIG. 4). A polarization key 74 (FIG. 5A) is provided, which provides registration between the sockets 54 (FIG. 4) on the connector adapter 50 in order to allow the sockets 54 to be correctly aligned with the pins 56 on the fiber-optic connector 52.

Figure 9:
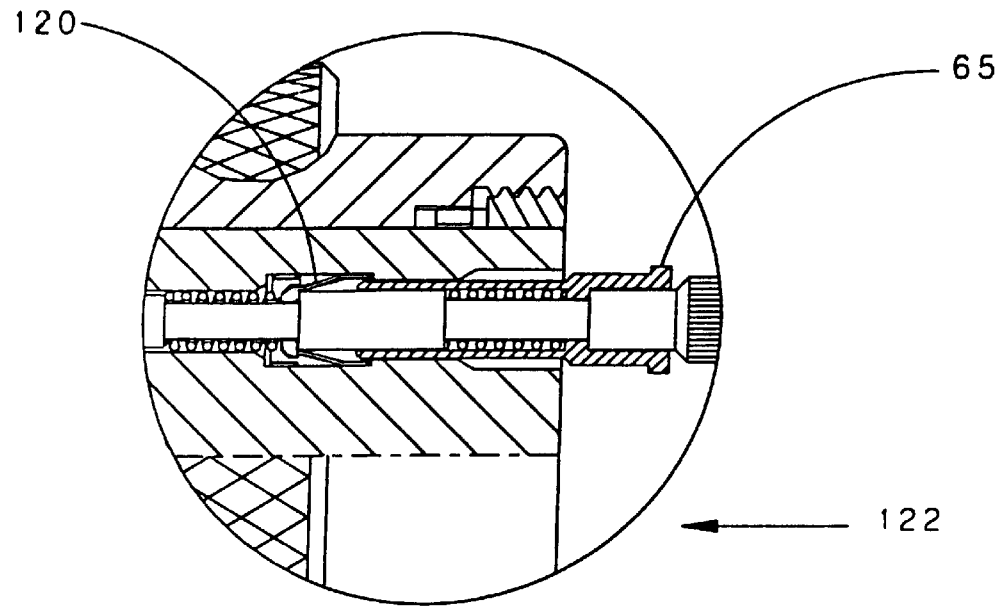
FIG. 9 is a quarter-section enlarged detail of the test probe in accordance with the present invention, shown locked in a lock position relative to the connector adapter.

The adapter body 68 is generally a hollow, cylindrical element formed with an interior annular shoulder 76. The annular shoulder 76 provides an axial seat for a cylindrical insert 78 FIG. 5B. In particular, the cylindrical insert 78 is formed with an external annular ring 80 that is adapted to seat against the annular shoulder 76 in the adapter body 68. In order to provide proper, radial alignment of the insert 78 relative to the polarization key 74 on the adapter body 68, a radial notch 82 or keyway is formed in the annular ring 80. The annular notch 82 is adapted to receive an insert alignment key 84, formed on the interior portion of the adapter body 68, adjacent the shoulder 76. Once the insert alignment key 84 is received in the keyway 82, the annular ring 80, formed on the insert 78, seats against the annular shoulder 76, formed on the interior of the adapter body 68. As shown in FIGS. 5A and 5B, the insert 78 is provided with a plurality of bores 94, which form the sockets 54 illustrated in FIG. 4. The bores 94 are configured to receive the fiber-optic test probe 58 and allow the fiber-optic test probe 58 to be axially secured thereto. A probe retention clip 96 is disposed within the bores 94 as shown in FIGS. 5A and 5B. The probe retention clips 96 are used to axially secure the test probe 58 relative to the insert 78 in a test position as generally shown in FIG. 9. The test probe 58 is provided with a release sleeve 65 (FIG. 4), which enables the test probe 58 to be disengaged from the probe retention clip 96 in a release position and removed.

Figure 19:
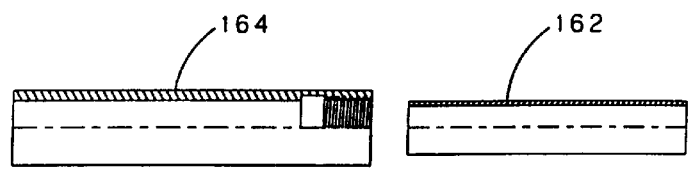
FIG. 19 is a sectional view of an alignment sleeve and a protective cover that forms a portion of the alternative embodiment of fiber optic test probe in accordance with the present invention.
Figure 20:
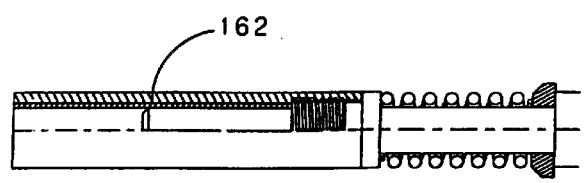
FIG. 20 is a sectional view of the assembled fiber-optic test probe incorporating the alternative terminus assembly illustrated in FIG. 17.
Figure 21:
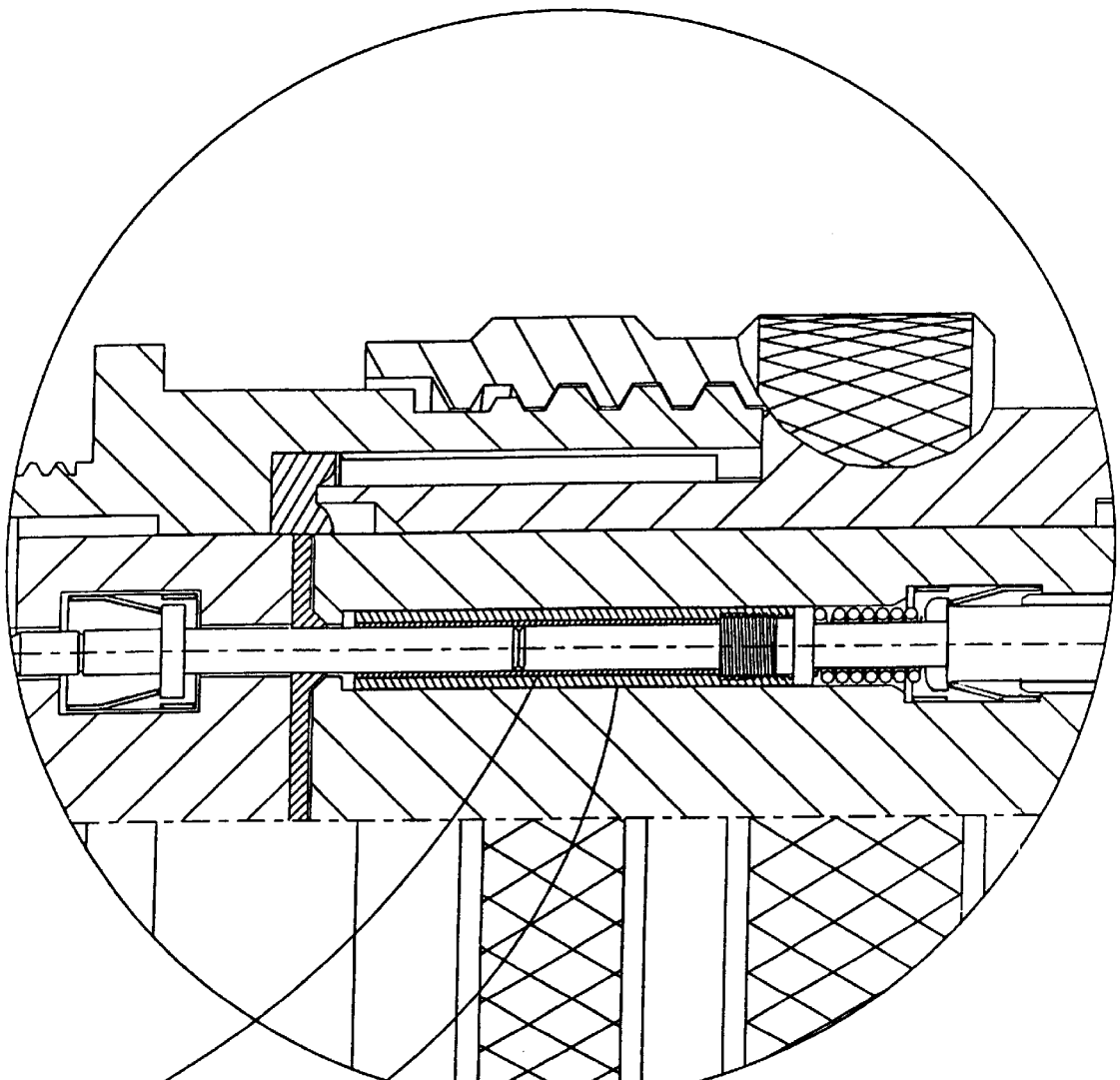
FIG. 21 is an enlarged view of a fiber optic test probe as illustrated in FIGS. 18–20 assembled to a connector adapter.

As shown in FIG. 5B, the insert 78 may be formed in three sections from a plastic material, such as **Ultem 2300, 30% glass filled. Once the probe retention clip 96 and an alignment sleeve 98 (discussed below) are inserted into the bore 94 as shown in FIGS. 5A, 5B and 19, the various sections of the insert 78 may be secured together with a suitable adhesive, once the bores are aligned. Various adhesives are suitable, such as epoxy. Alternatively, the parts may be chemically or ultrasonically welded together or retained by any known mechanical method.

A retention nut 86 is used to axially secure the insert 78 within the adapter body 68. More particularly, the adapter body 68 is provided with an interior thread 88 that is adapted to receive the insert retention nut 86, formed as a generally circular washer with corresponding threads 90 that are adapted to engage the corresponding threads 88 formed in the interior of the adapter body 68. As mentioned above, the annular ring 80 on the insert 78 is adapted to seat against the annular shoulder 76 in the adapter body. The retention nut 86 is formed with an interior diameter slightly greater than the outer diameter of the insert 78 and is adapted to seat on an opposing side of the annular ring 80, formed on the insert 78 to axially secure the insert 78 relative to the adapter body 68. One or more notches 92 may be formed in the retention nut 86 to facilitate insertion and removal of the retention nut 86.

The adapter body 78, coupling nut 70 and retention nut 86 may be formed from various materials, including aluminum alloy 6061-T6 and plated with, for example, electroless nickel. Other materials may also be suitable.

An important aspect of the invention relates to the probe alignment sleeve 98, disposed in the bore 94. The alignment sleeve 98 may be formed from a precise ceramic material and slotted along its length to provide resilience when the respective termini are mated. Alternatively, the alignment sleeve may be formed from a metallic or composite material, formed with or without a slot.

The probe alignment sleeve 98, as discussed above, provides axial alignment between the respective termini of the fiber-optic test probe 58 and the fiber-optic connector 46. In an alternate embodiment of the invention as illustrated in FIGS. 18–21, as discussed below, the probe alignment sleeve is formed as part of the test probe to facilitate relatively quick and easy replacement of the alignment sleeve.

The test probe 58, in accordance with the present invention, is illustrated in FIGS. 7A–7D. The test probe 58 includes a generally elongated terminus body 100 and a ferrule 101, formed from a ceramic, metallic or jewel material. The terminus body 100 is formed with an increased diameter cup shaped structure 102 on one end for receiving the ferrule 101. The cup-shaped structure 102 also acts as a spring retainer for a compression spring 104. A retention washer 105 is used to retain the compression spring 104 on the other end. The ferrule 101 is secured to the cup like structure 102 with a suitable adhesive, such as epoxy or, alternatively, press fit. The compression spring 104 and the retention washer 105 are assembled to the terminus body 100 to form a terminus assembly 106.

As shown in FIGS. 7B and 7C, the removal sleeve 65 is slipped over a probe body 108 on one end and a spring retainer body 107 on an opposite end. The spring retainer body 107 is formed as an elongated generally cylindrical member with a reduced diameter portion 109 for receiving a compression spring 110. The compression spring 110 seats between an annular shoulder 111 formed by the reduced diameter portion 109 and an annular shoulder 112, formed in the interior of the removal sleeve 65. The compression spring 110 biases the removal sleeve 65 in the direction of the arrow 113. The terminus assembly 106 is inserted into one end of the spring retainer body 107, seated against on interior shoulder 114 of the spring retainer 107, formed by the reduced diameter portion 109.

The ferrule 101 extends out one end of the probe body 108. An axial bore about five-thousandths of an inch is provided in the ferrule 101 and terminus 100 for receiving an optical fiber that is connected on one end to a simplex cable 60 (FIG. 4). The optical fiber is fed through the terminus 100 and ferrule 101 such that it protrudes slightly from the tip of the ferrule 101. An epoxy is applied to the tip of the ferrule 101 and cured. The tip of the ferrule 101 is polished to obtain a mirror-like finish that is essentially perpendicular with the longitudinal axis of the optical fiber, forming a terminus. Other geometries for the ferrule 101 are also suitable, for example, convex, concave, flat or angled to achieve the desired optical performance. The test probe 58 may optionally be provided with a strain relief boot 118. The strain relief boot 118 is adapted to be slid over the simplex cable 60 and onto one end of the probe body 100. As mentioned above, the strain relief boot 118 minimizes the sensitivity of the fiber-optic test probe respective to radial forces, which can affect the alignment of the terminus during testing and also protects the cable from damage resulting from bending.

Figure 8:
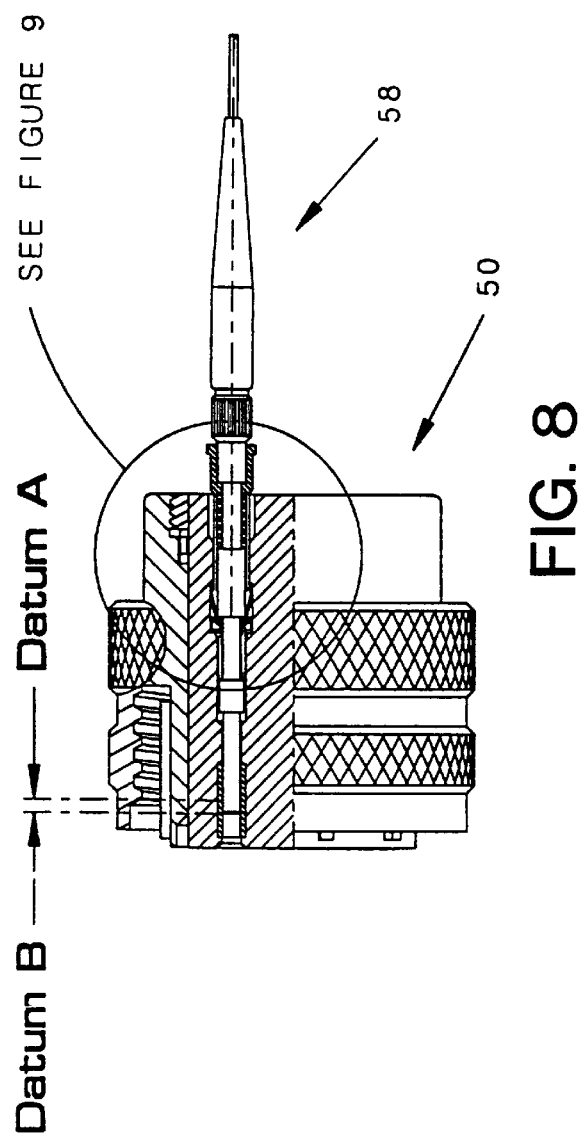
FIG. 8 is a longitudinal quarter-section assembled view of the fiber-optic probe illustrated in FIG. 7D, assembled to the connector adapter illustrated in FIG. 6.
Figure 10:
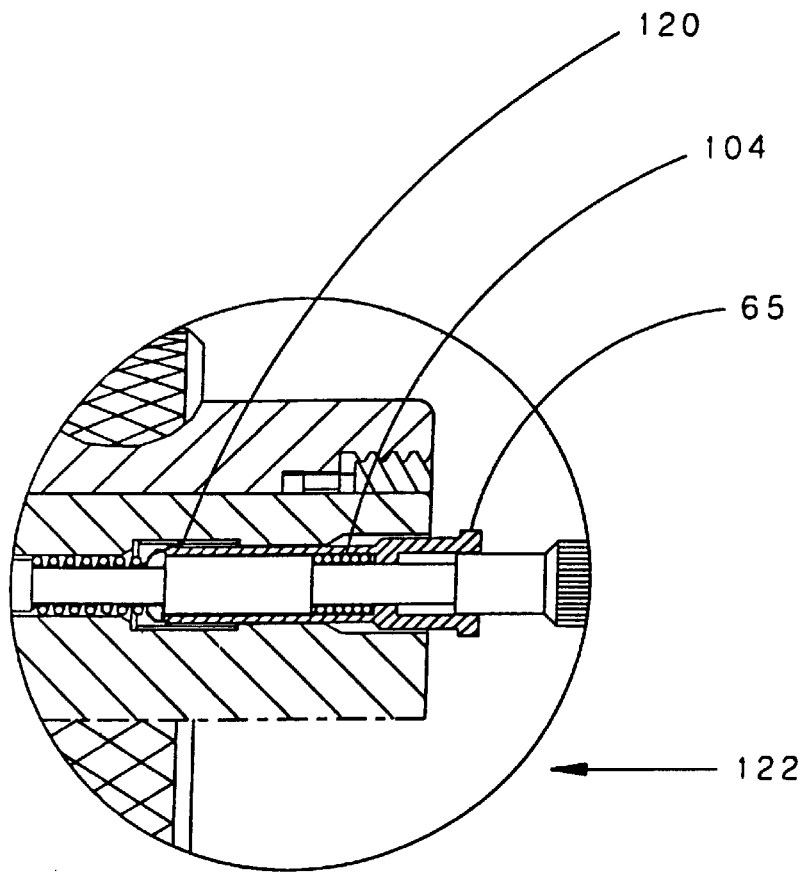
FIG. 10 is similar to FIG. 9, illustrating the test probe in accordance with the present invention in a remove position.

As shown in FIGS. 8–10, the test probe 58 is adapted to be axially locked and secured in position relative to the connector adapter 50. In addition, the configuration also allows for an axial biasing force, which biases the mating terminus towards one another to eliminate any air gaps, thus reducing transmission losses and improving performance of the connector adapter 50 and fiber optic test probe 58. In particular, referring to FIGS. 8–10, once the fiber-optic test probe 58 is inserted into one of the sockets 54 (FIG. 4) in the insert 78, inward radial fingers 120 (FIG. 9), formed as part of the probe retention clip 96, seat against the retention washer 105, thus preventing removal of the test probe 58, thereby defining a locked position as generally illustrated in FIG. 9. In order to remove the test probe 58, the probe removal sleeve 65 is moved in the direction of the arrow 122, which, as shown in FIG. 10, straightens the inward radial fingers 120 and thus disengages them from the clip retention washer 114 to enable the probe 58 to be removed. As the probe removal sleeve 65 is moved in the direction of the arrow 122, the compression spring 104 is compressed, thus biasing the probe removal sleeve 65 in a direction opposite to the direction shown by the arrow 122.

Figure 11:
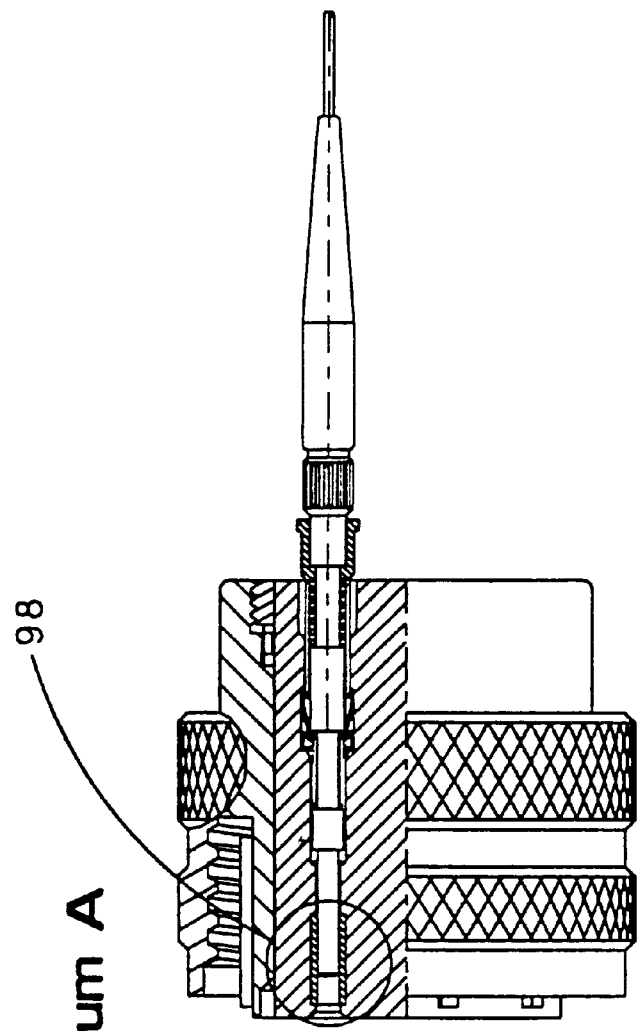
FIG. 11 is similar to FIG. 6 shown with a connector adapter about to be mated with a standard receptacle.
Figure 11:
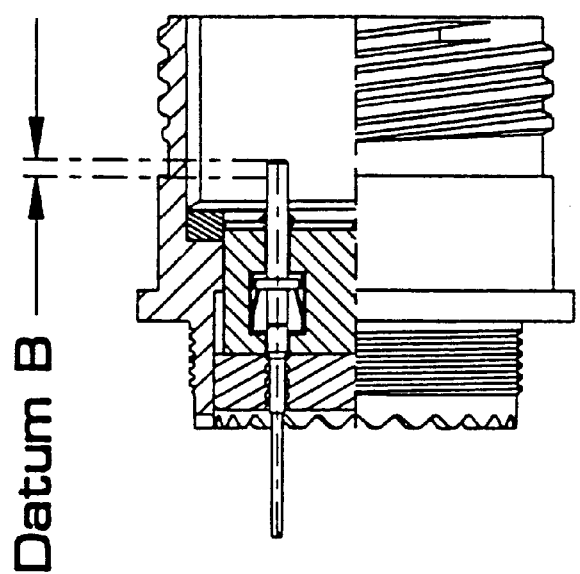
Figure 12:
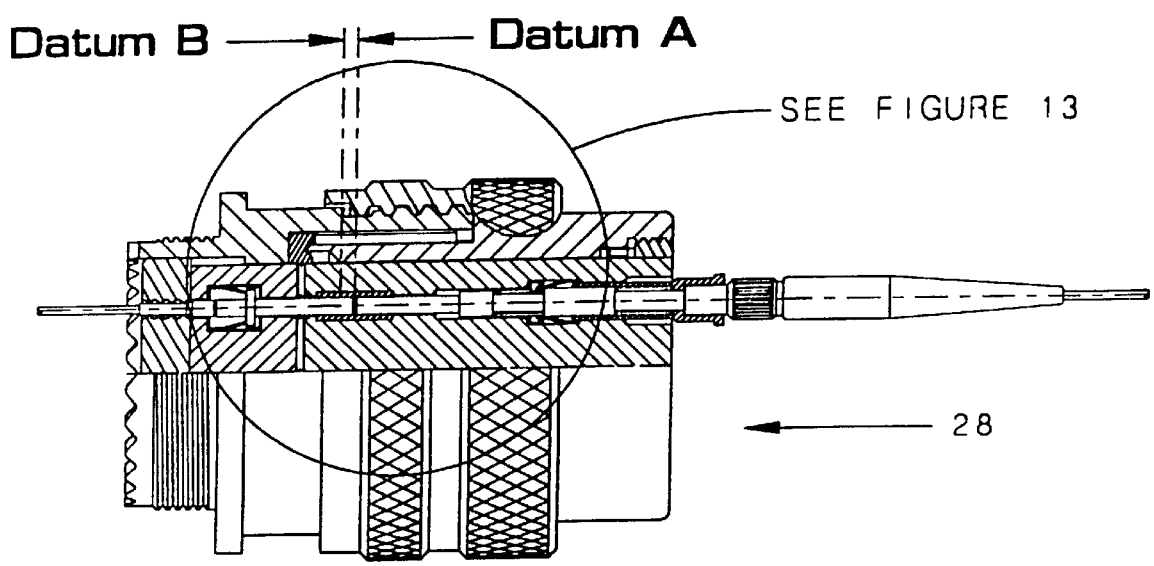
FIG. 12 is similar to FIG. 11 shown with the connector adapter mated to a standard receptacle.
Figure 13:
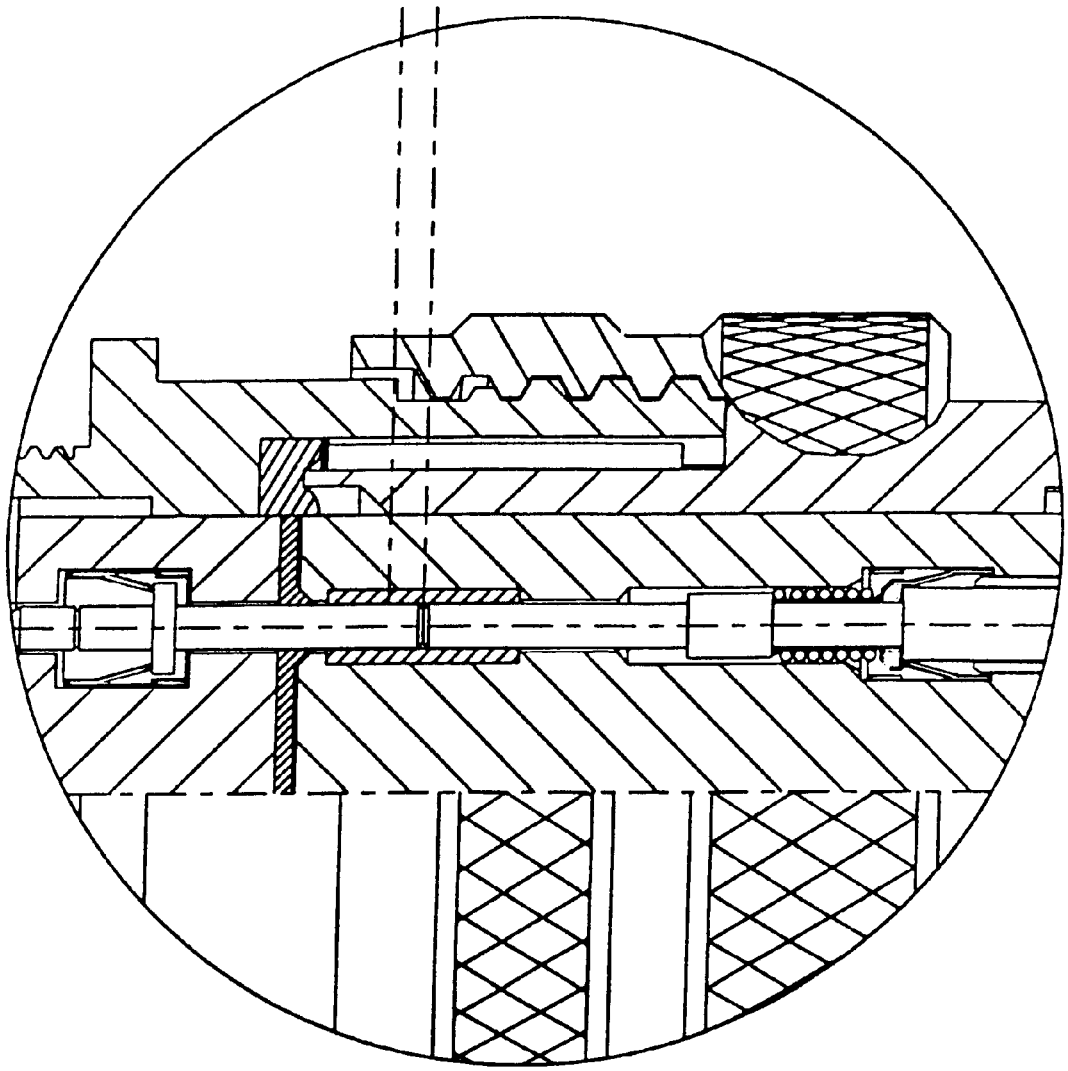
FIG. 13 is an enlarged view of the circle portion of FIG. 12, illustrating a take-up feature of the test probe in accordance with the present invention.

As mentioned above, another important aspect of the invention is the axial biasing force provided between the mating termini, which virtually eliminates air gaps therebetween, thus reducing transmission losses and improving performance. In particular, with reference to FIGS. 8 and 11–13, the respective termini of the fiber-optic test probe 58 and the optical connector 46 are adapted to be received and axially aligned by way of the alignment sleeve 98. Referring first to FIG. 8, the terminus of the test probe 58 extends slightly beyond a reference or datum point A to a datum point B, for example by about 0.050 inches. As shown in FIG. 11, the terminus, carried by the optical connector 46, extends to the datum A. As shown in FIG. 12, when the connector adapter 50 is assembled to the fiber-optic connector 46, the terminus of the fiber-optic connector 46, as mentioned above, extends to the datum A. However, as mentioned above and illustrated in FIGS. 8 and 11, once the fiber-optic test robe 58 is inserted, its pin terminus extends to the datum B. Thus, while a fiber-optic test probe 58 is being inserted, the respective termini contact. As the fiber-optic test probe 58 is inserted in a direction shown by the arrow 122, it pushes back the terminus of the connector 46 by a distance equivalent to the distance between the datums A and B. As the fiber-optic test probe 58 is seated and locked in place as discussed above, the axial force between the respective termini is equalized, pushing the terminus of the fiber-optic test probe 58 back to the datum A. As the terminus of the test probe 58 is pushed back toward the datum A, the compression or take-up spring 104 is compressed slightly, providing an axial compression force on the terminus of the test probe 58 in the direction of the arrow 122. The axial compression force ensures a good and solid contact between the respective termini thus eliminating air gaps therebetween and which minimize transmission losses due to reflections and refraction.

Figure 14:
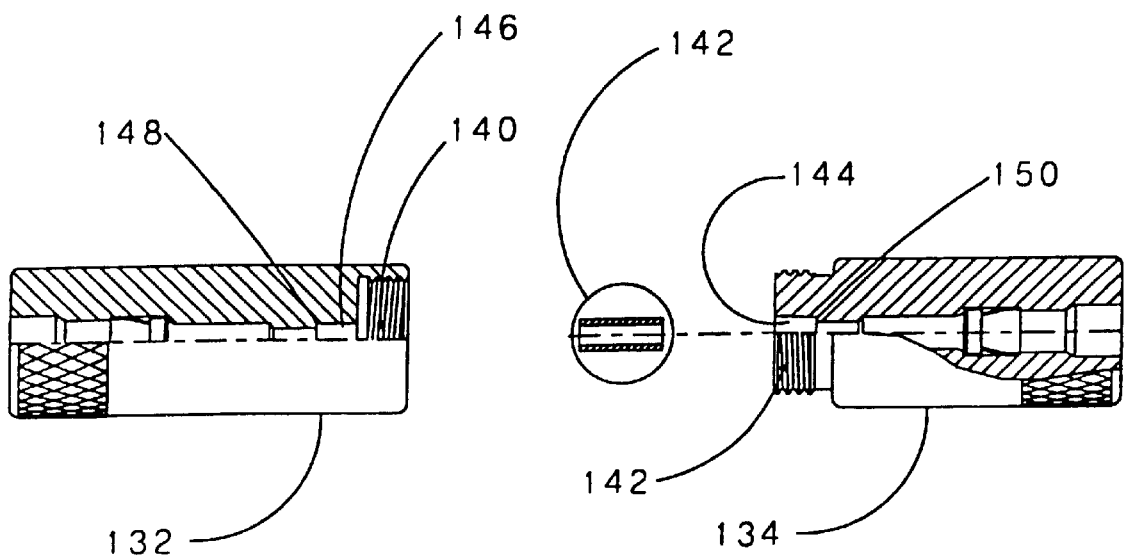
FIG. 14 is an exploded partial view of a probe calibration adapter in accordance with the present invention.
Figure 15:
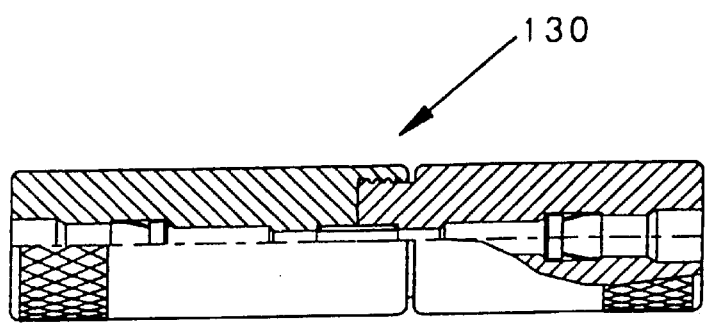
FIG. 15 is an assembled partial sectional view of the probe calibration adapter illustrated in FIG. 14.
Figure 16:
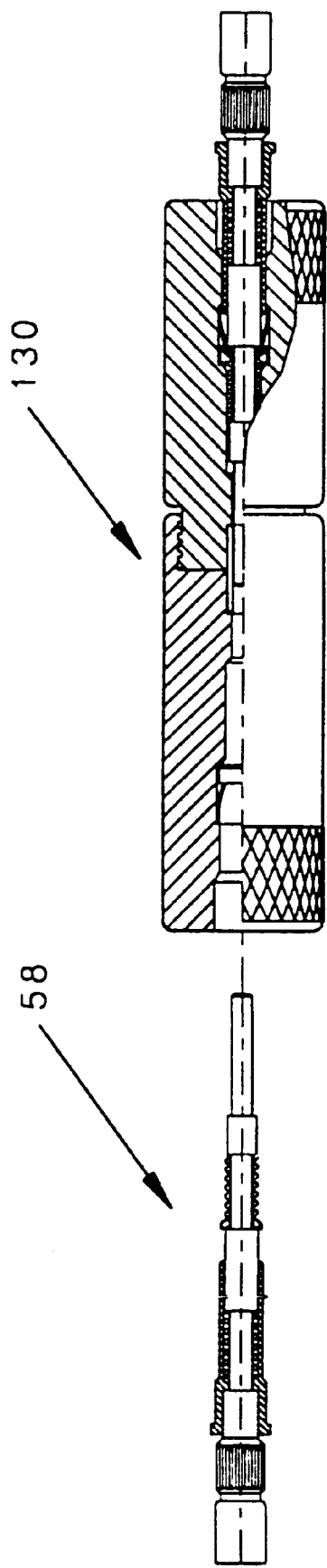
FIG. 16 is similar to FIG. 15, shown with one fiber-optic test probe in accordance with the present invention installed thereto.
Figure 17:
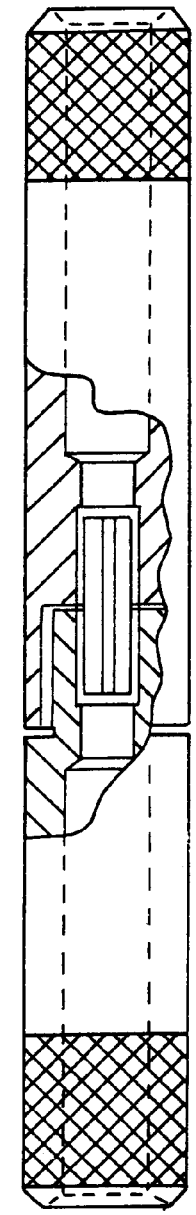
FIG. 17 is similar to FIG. 15 illustrating the alignment sleeve.
Figure 18:
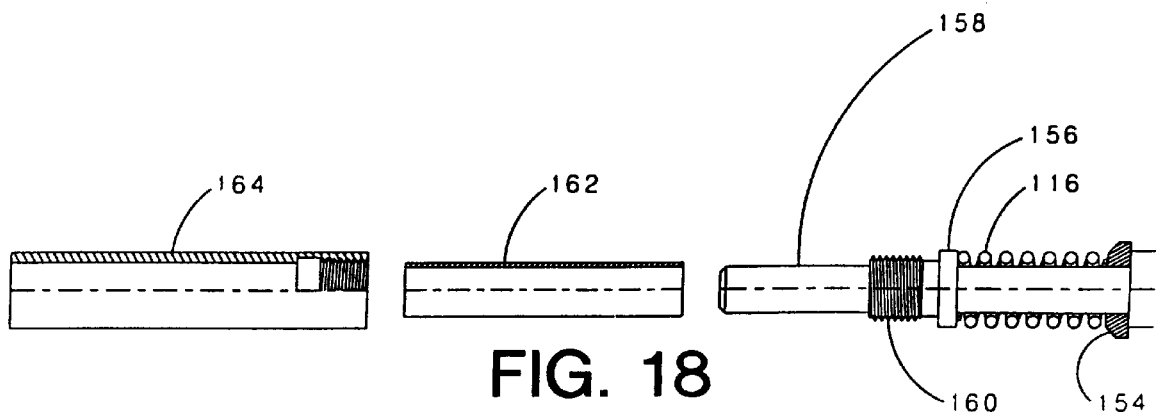
FIG. 18 is an exploded assembly drawing of an alternative embodiment a terminus assembly for a fiber-optic test probe in accordance with the present invention, illustrating the successive assembly steps.

A probe calibration, or feed-through adapter, in accordance with the present invention, is illustrated in FIGS. 14–16. The probe calibration adapter, generally identified with the reference numeral 130, functions in essentially the same manner as the connector adapter 50 discussed above, but is used to calibrate test probes 58 and is thus adapted to connect to fiber-optic test probes 58, together. The probe calibration adapter 130 is formed as a generally cylindrical member with a female adapter body half 132 and a male adapter body half 134. Each of the adapter body halves 132 and 134 are provided with bores 136 and 138, similar to the bores 94, discussed above. A probe retention clip 138 is provided in each of the bores 136 and 138, as shown in FIG. 14. In order to insert the probe retention clip 138 within the bores 136 and 138, the adapter body halves 132, as well as the adapter body 134, may be formed in axial sections and secured together to form the adapter body halves 132 and 134. The adapter body half 132 is provided with a threaded interior bore 140 and is adapted to receive a corresponding extending threaded nipple 142, formed on the adapter body half 134.

Each of the adapter body halves 132 and 134 include corresponding bores 144 and 146 for receiving the alignment sleeve 142. Annular shoulders 148 and 150 are formed at the end of the respective bores 146 and 144, which enable the alignment sleeve 142 to seat thereagainst. In order to assemble the probe calibration adapter 130, the alignment sleeve 142 is simply inserted in one or the other of the bores 144 or 146 and the adapter body halves 132 and 134 are screwed or pressed together as shown in FIG. 15. Fiber-optic test probes 58 are inserted into each end of the probe calibration adapter 130 as generally shown in FIG. 16. The respective probe termini are received in the alignment sleeve 142. The take-up spring 110 in each of the probes 58 provide an axial compression force, forcing the respective termini together as discussed above, thereby eliminating air gaps and reducing transmission losses in a similar manner as discussed above.

An alternate embodiment of the fiber-optic test probe is illustrated in FIGS. 18–21 and generally identified with the reference numeral 150. In this embodiment, the alignment sleeve is not provided in either the connector adapter 50 or the probe calibration adapter 30. Rather, in order to facilitate replacement of the alignment sleeve, the alignment sleeve is formed as part of the fiber-optic test probe 150. In the embodiment illustrated in FIG. 17, the probe body 108 and the probe removal sleeve 65, are formed in the same manner as discussed above. In this embodiment, a terminus assembly 152 (FIG. 18) is provided, which includes a retention washer 154 and compression spring 116. In place of the cup-shaped device 102 used to hold the ferrule 101 as illustrated in FIG. 7A, a relatively shorter ferrule 158 is provided with a coupling device 156. The coupling device 156 is used to couple the ferrule 158 to the terminus body 152. In this embodiment, the ferrule 158 is relatively shorter than the ferrule 116 provided in the fiber-optic test probe 58, illustrated in FIG. 7. The coupling device 156 includes a threaded portion 160. An alignment sleeve 162 is adapted to be received over the ferrule 158 and seat against the threaded portion 160 of the coupling device 156. A protective cover 164, with an interior threaded portion 166, slides over the alignment sleeve 162 and is threaded onto the threaded portion 160 to axially secure the protective cover 164 to the coupling device 156. The protective cover 164, for example a metallic cover, is used to protect the alignment sleeve 162 during shipping and handling, as well as during insertion and removal of the ferrule 158 into the connector adapter 50 or probe calibration adapter 130. The embodiment illustrated in FIG. 17 allows the alignment sleeve 162 to be easily replaced if damaged. In the embodiment illustrated in FIGS. 5A and 6, the alignment sleeve 98 is captured in the connector adapter 50. That embodiment, captures the alignment sleeve 162, requires disassembly of the insert 78 for replacement of the alignment sleeve 98, making replacement of the alignment sleeve 98 more labor intensive relative to the embodiment illustrated in FIGS. 17–20.

Obviously, many modifications and variations of the present invention are possible in light of the above teachings. Thus, it is to be understood that, within the scope of the appended claims, the invention may be practiced otherwise than as specifically described above.

What is claimed and desired to be secured by letters patent of the U.S. is:

1. A fiber optic test probe for testing termini in a fiber optic connector, the fiber optic test probe comprising:
    a probe body for carrying a terminus;
    a retention washer disposed on said terminus;
    a first compression spring for biasing said retention washer relative to said probe body;
    a removal sleeve mounted for axial movement for receiving said probe body, said removal sleeve adapted to move toward said retention washer in a release position and spaced away from said retention washer in a locked position; and
    a second compression spring for biasing said removal sleeve away from said retention washer.

2. A fiber optic test probe as recited in claim 1, further including an alignment sleeve.

3. A feed through adapter for calibrating fiber optic test probes;
    a generally cylindrical body;
    a bore formed in said cylindrical body for receiving test probes at each end of said generally cylindrical body; and
    a pair of probe retention clips with one or more resilient fingers, said spring retention clips disposed at each end of said bore to lock said test probes in place.

4. A feed through adapter as recited in claim 3, further excluding an alignment sleeve for aligning the respective termini of said test probes.

5. A fiber test probe for testing termini in a fiber optic connector, the fiber optic connector test probe comprising:
    a terminus mounted for axial movement;
    biasing means for biasing said test probe in an axial direction; and
    means for carrying said terminus and said biasing means.

6. A fiber optic test probe for testing termini in a fiber optic connector, said fiber optic test probe adapted to be received in a connector adapter and coupled to said fiber optic connector to be tested, said connector adapter including one or more axial bores adapted to aligned with the fiber optic connector to be tested, said one or more axial bores including a probe retention clip for locking fiber optic test probe relative to said connector adapter when said fiber optic test probe is in a locked position and releasing said fiber optic test probe relative to said connector adapter when said fiber optic connector is in a release position, the fiber optic test probe comprising:
    a terminus assembly;
    a retention washer mounted on said terminus assembly;
    a compression spring carried by said terminus assembly, axially retained by said terminus assembly and said retention washer;
    a removal sleeve mounted for axial movement relative to said retention washer, said removal sleeve adapted to be spaced away from said retention washer in a locked position to enable said retention washer to be captured by said probe retention clip in said connector adapter, said compression being compressed in said locked position and providing axial forces on said terminus, said removal sleeve adapted to release said retention washer from said probe retention clip in a release position to enable said test probe to be withdrawn from said connector adapter; and
    a first housing for housing said test probes.

7. The fiber optic test probe as recited in claim 6, further including a second housing for partially receiving said terminus assembly, sid second housing adapted to be received within said removal sleeve to enable axial movement of said removal sleeve relative to said second housing.

8. The fiber optic test probe as recited in claim 7, wherein said second housing is mounted as formed with an increased diameter portion which forms a spring retainer and said removal sleeve is formed with an annular shoulder, further including a second compression spring disposed between said annular shoulder and said increased diameter portion.

9. The fiber optic test probe as recited in claim 8, further including a strain relief boot coupled to said first housing for protecting said test probe from radial forces.

10. The fiber optic test probe as recited in claim 6, wherein said terminus assembly includes a ferrule and a terminus body.

11. The fiber optic test probe as recited in claim 10, wherein said terminus body is formed with a cup-like structure on one end for receiving said ferrule.

12. The fiber optic test probe as recited in claim 10, further including a coupling device for coupling said ferrule and said terminus body.

13. The fiber optic test probe as recited in claim 12, wherein said test probe includes an alignment sleeve.

14. The fiber optic test probe as recited in claim 12, wherein said alignment is received over said ferrule, said alignment sleeve adapted to be seated against said coupling device in an axial direction.

15. The fiber optic test probe as recited in claim 14, wherein further including a protective cover, for protecting said alignment sleeve during shipping.

16. The fiber optic test probe as recited in claim 15, wherein said coupling device is provided with a threaded portion and said protective cover is provided with a mating threaded portion to enable said protective cover to be secured to said coupling device.

17. A fiber optic test probe for testing termini in a fiber optic connector, said fiber optic test probe adapted to be received in a connector adapter and coupled to said fiber optic connector to be tested, said connector adapter including one or more axial bores adapted to aligned with in the fiber optic connector to be tested, said one or more axial bores including a probe retention clip for locking fiber optic test probe relative to said connector adapter when said fiber optic test probe is in a locked position and releasing said fiber optic test probe relative to said connector adapter when said fiber optic connector is in a release position, the fiber optic test probe comprising:

a terminus assembly; and means for biasing said terminus assembly in an axial direction when said test probe is in a locked position and means for locking said connector adapter defining a locked position; and means for releasing said test probe relative to said connector adapter.

* * * * *